(12) United States Patent
Salazar et al.

(10) Patent No.: US 10,640,216 B2
(45) Date of Patent: May 5, 2020

(54) PROJECTION CASSETTE ASSEMBLIES AND RELATED SYSTEMS FOR USE WITH AIRCRAFT SEATS

(71) Applicant: Thales Avionics, Inc., Irvine, CA (US)

(72) Inventors: Lori Elizabeth Salazar, Mission Viejo, CA (US); Jeffrey S. Everhart, Winston-Salem, NC (US)

(73) Assignee: Thales Avionics, Inc., Irvine, CA (US)

( * ) Notice: Subject to any disclaimer, the term of this patent is extended or adjusted under 35 U.S.C. 154(b) by 90 days.

(21) Appl. No.: 15/408,523

(22) Filed: Jan. 18, 2017

(65) Prior Publication Data

US 2017/0210472 A1 Jul. 27, 2017

Related U.S. Application Data

(60) Provisional application No. 62/287,685, filed on Jan. 27, 2016.

(51) Int. Cl.

| | |
|---|---|
| *B64D 11/00* | (2006.01) |
| *G03B 21/10* | (2006.01) |
| *G03B 21/62* | (2014.01) |
| *G03B 29/00* | (2006.01) |
| *H04N 9/31* | (2006.01) |
| *G03B 21/28* | (2006.01) |
| *G06F 3/042* | (2006.01) |

(52) U.S. Cl.
CPC ........ *B64D 11/00152* (2014.12); *G03B 21/10* (2013.01); *G03B 21/28* (2013.01); *G03B 21/62* (2013.01); *G03B 29/00* (2013.01); *G06F 3/0425* (2013.01); *H04N 9/3147* (2013.01); *H04N 9/3173* (2013.01); *H04N 9/3185* (2013.01)

(58) Field of Classification Search
CPC combination set(s) only.
See application file for complete search history.

(56) References Cited

U.S. PATENT DOCUMENTS

| 4,639,106 A | 1/1987 | Gradin |
| 5,123,728 A * | 6/1992 | Gradin ............... B64D 11/0015 348/61 |
| 5,548,356 A | 8/1996 | Portman |
| | (Continued) | |

FOREIGN PATENT DOCUMENTS

WO WO 2013/190153 A1 12/2013

*Primary Examiner* — Jefferey F Harold
*Assistant Examiner* — Humam M Satti
(74) *Attorney, Agent, or Firm* — Sage Patent Group

(57) ABSTRACT

A projection system for use with an aircraft seat includes a cassette frame defining an open ended cavity, a front panel configured to couple to a front of the cassette frame to enclose the cavity, and a projector system held in the cavity. The cassette frame includes a rear panel, an upper panel extending outwardly away from the rear panel, a lower panel extending outwardly away from the rear panel, and first and second side panels extending outwardly from the rear panel. The rear panel, the upper panel, the lower panel and the first and second side panels define an open ended cavity. The projector system and the front panel are configured such that an image and/or video projected by the projector system is projected from the cavity through the front panel. The cassette frame is sized and configured to be received and releasably held in an aircraft seatback.

20 Claims, 5 Drawing Sheets

(56) References Cited

U.S. PATENT DOCUMENTS

| | | | |
|---|---|---|---|
| 6,540,363 B1* | 4/2003 | Steffensmeier | H04N 9/3147 |
| | | | 348/745 |
| 6,964,481 B2 | 11/2005 | Pho et al. | |
| 7,722,192 B2 | 5/2010 | Huonker | |
| 8,461,505 B2 | 6/2013 | Budinger et al. | |
| 8,540,309 B2* | 9/2013 | Berger | B64D 11/0015 |
| | | | 297/163 |
| 8,789,954 B1* | 7/2014 | Atkins | G03B 21/58 |
| | | | 348/746 |
| 9,584,890 B1* | 2/2017 | Tuccinardi | H04R 5/04 |
| 2004/0239890 A1* | 12/2004 | Starkweather | G03B 21/62 |
| | | | 353/69 |
| 2005/0046755 A1* | 3/2005 | Hattori | B60R 11/0211 |
| | | | 348/837 |
| 2005/0046800 A1* | 3/2005 | Hamada | B60R 11/02 |
| | | | 353/15 |
| 2005/0110952 A1* | 5/2005 | Pho | A47C 1/13 |
| | | | 353/28 |
| 2006/0075934 A1* | 4/2006 | Ram | B60N 3/004 |
| | | | 108/44 |
| 2006/0250692 A1* | 11/2006 | Peterson | G03B 21/10 |
| | | | 359/443 |
| 2008/0024463 A1* | 1/2008 | Pryor | B60K 35/00 |
| | | | 345/175 |
| 2010/0195202 A1* | 8/2010 | Masalkar | G03B 21/60 |
| | | | 359/460 |
| 2010/0201950 A1 | 8/2010 | Budinger et al. | |
| 2012/0019781 A1* | 1/2012 | Kuhlman | B60K 35/00 |
| | | | 353/13 |
| 2012/0063081 A1* | 3/2012 | Grunwald | B60R 11/0235 |
| | | | 361/679.41 |
| 2013/0265502 A1* | 10/2013 | Huebner | G06F 3/0325 |
| | | | 348/789 |
| 2014/0192268 A1 | 7/2014 | Petrisor | |
| 2015/0123878 A1* | 5/2015 | Kawasaki | B60R 1/00 |
| | | | 345/7 |
| 2015/0156447 A1* | 6/2015 | Lee | H04N 5/7458 |
| | | | 348/745 |
| 2016/0209739 A1* | 7/2016 | Matoba | G03B 21/28 |
| 2016/0274674 A1* | 9/2016 | Valdes | B64D 11/0015 |
| 2017/0237882 A1* | 8/2017 | Shiohara | B60R 1/00 |
| | | | 348/148 |

\* cited by examiner

PROJECTION CASSETTE ASSEMBLIES AND RELATED SYSTEMS FOR USE WITH AIRCRAFT SEATS

RELATED APPLICATIONS

This application claims priority to U.S. Provisional Application No. 62/287,685, filed Jan. 27, 2016, the disclosure of which is incorporated by reference in its entirety.

BACKGROUND

It may be desirable to provide a modular projection cassette assembly that can be easily installed in and removed from a mounting structure that is formed in, for example, a seatback of an aircraft seat.

SUMMARY

Some embodiments described herein are directed to a projection system for use with an aircraft seat. The system includes a cassette frame defining an open ended cavity, a front panel configured to couple to a front of the cassette frame to enclose the cavity, and a projector system held in the cavity. The cassette frame includes a rear panel, an upper panel extending outwardly away from the rear panel, a lower panel extending outwardly away from the rear panel, and first and second side panels extending outwardly from the rear panel. The rear panel, the upper panel, the lower panel and the first and second side panels define the open ended cavity. The projector system and the front panel are configured such that an image and/or video projected by the projector system is projected from the cavity through the front panel. The cassette frame is sized and configured to be received and releasably held in an aircraft seatback.

Some other embodiments described herein are directed to a projection system for use with an aircraft seat. The system includes a cassette frame defining an open ended cavity, a front panel or surface configured to couple to a front of the cassette frame to enclose the cavity, and a projector system held in the cavity. The projector system and the front panel are configured such that an image and/or video projected by the projector system is projected from the cavity through the front panel. The front panel includes first and second opposite sides with the first side facing the cavity when the front panel is coupled to the front of the cassette frame. The projected image and/or video impinges on the first side of the front panel and is viewable on the second side of the front panel. The cassette frame is sized and configured to be received and releasably held in an aircraft seatback with the second side of the front panel facing outwardly toward a passenger facing the seatback.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

The accompanying drawings, which are included to provide a further understanding of the disclosure and are incorporated in and constitute a part of this application, illustrate certain non-limiting embodiments of the invention. In the drawings.

DETAILED DESCRIPTION

The following detailed description discloses various non-limiting example embodiments of the invention. The invention can be embodied in many different forms and is not to be construed as limited to the embodiments set forth herein.

Although various embodiments of the present invention are explained herein in the context an in-flight entertainment (IFE) environment, other embodiments of entertainment systems and related controllers are not limited thereto and may be used in other environments, including other vehicles such as ships, submarines, buses, trains, commercial/military transport aircraft, and automobiles, as well as buildings such as conference centers, sports arenas, hotels, homes, etc. Accordingly, in some embodiments users are referred to, in a non-limiting way, as passengers.

Figure 1:
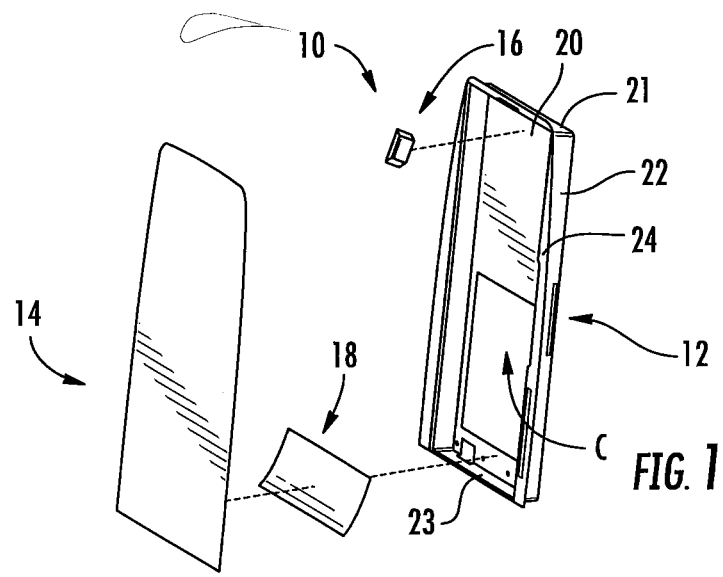
FIG. 1 is an exploded perspective view of a projection cassette assembly in accordance with some embodiments.
Figure 2A:
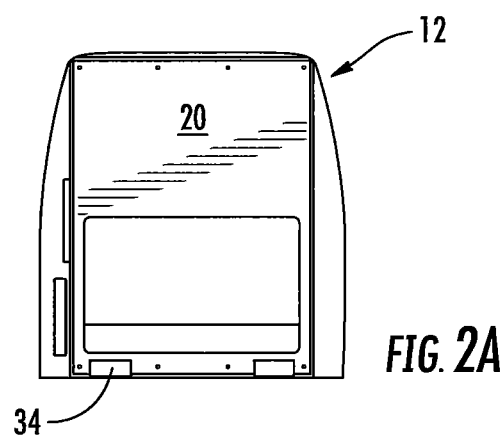
FIG. 2A is a rear view of the cassette assembly of FIG. 1.
Figure 2B:
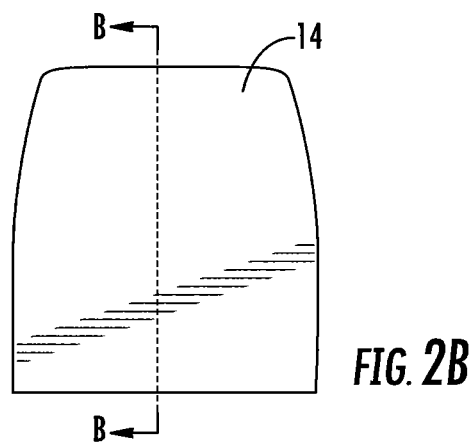
FIG. 2B is a front view of the cassette assembly of FIG. 1.
Figures 3A, 3B:
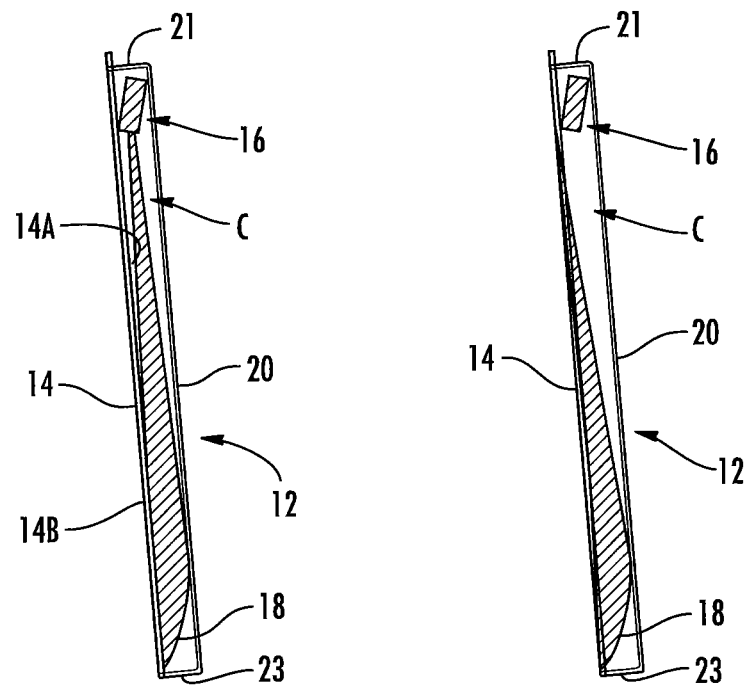
FIGS. 3A and 3B are sectional views of the cassette assembly of FIG. 1 taken along the line B-B in FIG. 2B; these figures illustrate alternative projection paths according to some embodiments.

A video projection cassette assembly 10 according to some embodiments is illustrated in FIGS. 1-3. The assembly 10 may include a cassette frame 12, a viewing panel or surface 14 (also referred to herein as the front panel or surface), a projector or projector system 16 and a mirror 18.

The cassette frame 12 includes a rear panel or surface 20, an upper panel or surface 21, a lower panel or surface 23, and a plurality of side panels or surfaces 22 that each extend outwardly away from the rear panel 20. The rear panel 20 and the side panels 22 define an open ended cavity C.

The viewing surface may be is configured to couple to the cassette frame 12. For example, the viewing surface 14 may be connectable to one or more flanges 24 that extend from the side panels 22 of the cassette frame 12. The cassette frame 12 and the viewing surface 14 together may be referred to herein as the cassette housing.

According to some embodiments, the viewing surface 14 is or includes plastic and/or fabric. As will be described in more detail below, the viewing surface 14 is configured such that projected image or video impinges on one side of the viewing surface 14 and is visible to a viewer on the opposite side of the viewing surface 14. That is, the projected image or video projects through the viewing surface 14.

Referring to FIG. 3, the projector 16 and the mirror 18 are held in the cavity C. The projector 16 and the mirror 18 may be at opposite ends of the cavity C. For example, the projector 16 may be coupled to an upper portion of the cassette frame 12 (e.g., at or adjacent the upper panel 21) and/or an upper portion of the viewing surface 14 and the mirror may be coupled to a lower portion of the cassette frame 12 (e.g., at or adjacent the lower panel 23) and/or a lower portion of the viewing surface 14.

The projector 16 may include an LED light source, an image generating chip (e.g., Digital Light Processor or DLP) and/or focusing optics. According to some embodiments, the projector 16 is a pico projector. According to some embodiments, the projector 16 is a short throw or ultra short throw projector.

The projector 16 may be positioned and/or the mirror 18 may be curved to provide the desired projection path for the image or video. The mirror 18 may be curved so as to be concave relative to the viewing surface 14.

As illustrated in FIG. 3, the projection path may be such that the projected image or video impinges on only a portion of a first side 14A of the viewing surface 14 or on all or substantially all of the first side 14A the viewing surface 14. As described above, the viewing surface 14 is configured such that the projected image or video that impinges on the first side 14A of the viewing surface 14 is visible on a second, opposite side 14B of the viewing surface. In this regard, the projection path may be selected to provide a relatively large image or video (e.g., on all or substantially all of the viewing surface second side 14B) or a smaller image or video (e.g., on only a portion of the viewing surface second side 14B). Moreover, the projection path may be selected to provide the desired position of the image or video on the viewing surface 14.

According to some embodiments, a plurality of projector systems 16 may be provided in the cavity C. Each projector 16 may be configured to project a portion of an image or video, and the individual portions of the image or video may be tiled or stitched together to provide the complete image or video. This may allow for larger images or videos to be displayed.

Figure 4:
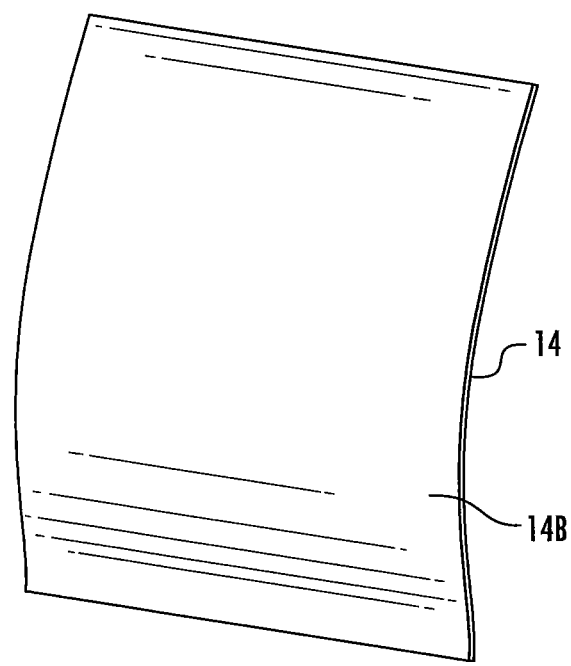
FIG. 4 is a perspective view of a curved viewing panel of the cassette assembly of FIG. 1 according to some embodiments.

Referring to FIG. 4, the viewing surface 14 may be curved. For example, at least a portion of the second surface 14B (which faces the viewer) may be convex. The curved configuration may advantageously provide a seamless and aesthetically pleasing appearance when the cassette assembly 10 is mounted to a mounting structure as described in more detail below.

A sensor such as an infrared camera may be provided to record gestures at the viewing surface 14. The sensor may be positioned in the cavity C or may be positioned elsewhere within line of sight of the viewing surface 14. A controller or processor may be provided to interpret the recorded gestures and control the image or video based on the gestures. The controller or processor may be positioned in the cavity C or may be positioned elsewhere (e.g., the controller may be one of the controllers or processors described below). The image or video may include user interface features such as buttons, icons, sliders and the like and the user may control the image or video by tapping or sliding on the viewing surface 14, for example.

According to some embodiments, the controller may be configured to distort the image or video such that a corresponding image or video projected onto the viewing surface appears undistorted. This may be particularly advantageous with respect to the curved viewing surface 14 described above.

Figure 5:
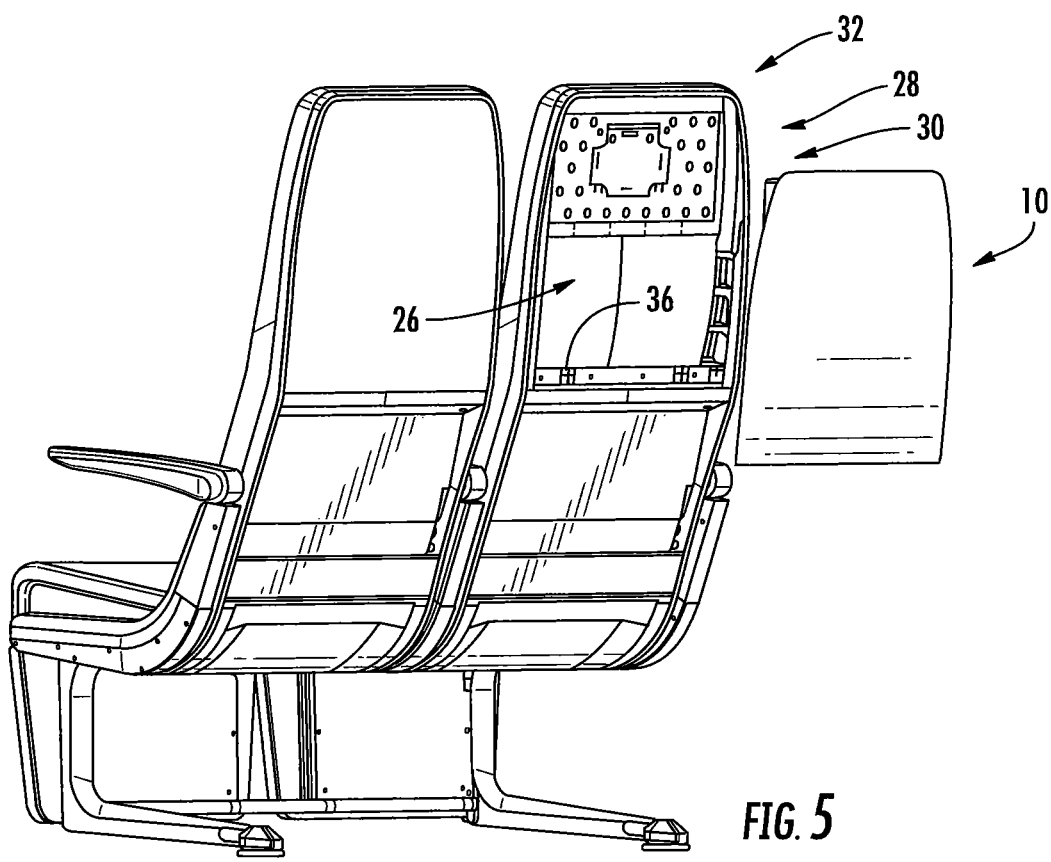
FIG. 5 is a perspective view of the cassette assembly of FIG. 1 ready to be installed in an aircraft seatback.

Referring to FIG. 5, according to some embodiments, the cassette assembly 10 is sized and configured to be received in and mounted to a mounting structure 26 in the seatback 28 of an aircraft seat 30. As illustrated, the mounting structure 26 is a recessed region defined in the rear of a frame 32 of the seat 30. The cassette assembly 10 and/or the mounting structure 26 may include one or more mounting features to hold the cassette assembly in the mounting structure. For example, the cassette assembly 10 may include a plurality of recesses 34 (FIG. 2) that are each sized and configured to receive a latch member 36 in the mounting structure 26. Additional hardware (e.g., fasteners) may be used to help secure the cassette assembly 10 in the seatback 28. The cassette assembly 10 is designed to be installed and removed from the seatback 28 with relative ease.

Figure 6:
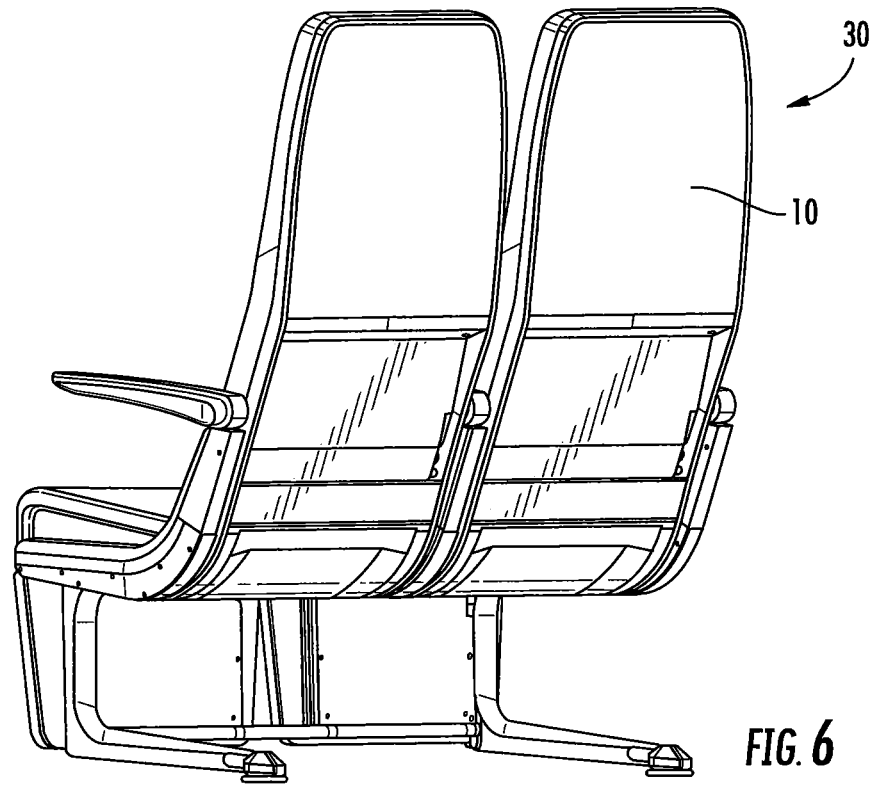
FIG. 6 is a perspective view of the cassette assembly installed in the aircraft seatback of FIG. 5.

FIG. 6 illustrates the cassette assembly 10 received and held in the aircraft seat 30. The cassette assembly 10 is sized and shaped to provide a seamless and aesthetically pleasing appearance.

Figure 7:
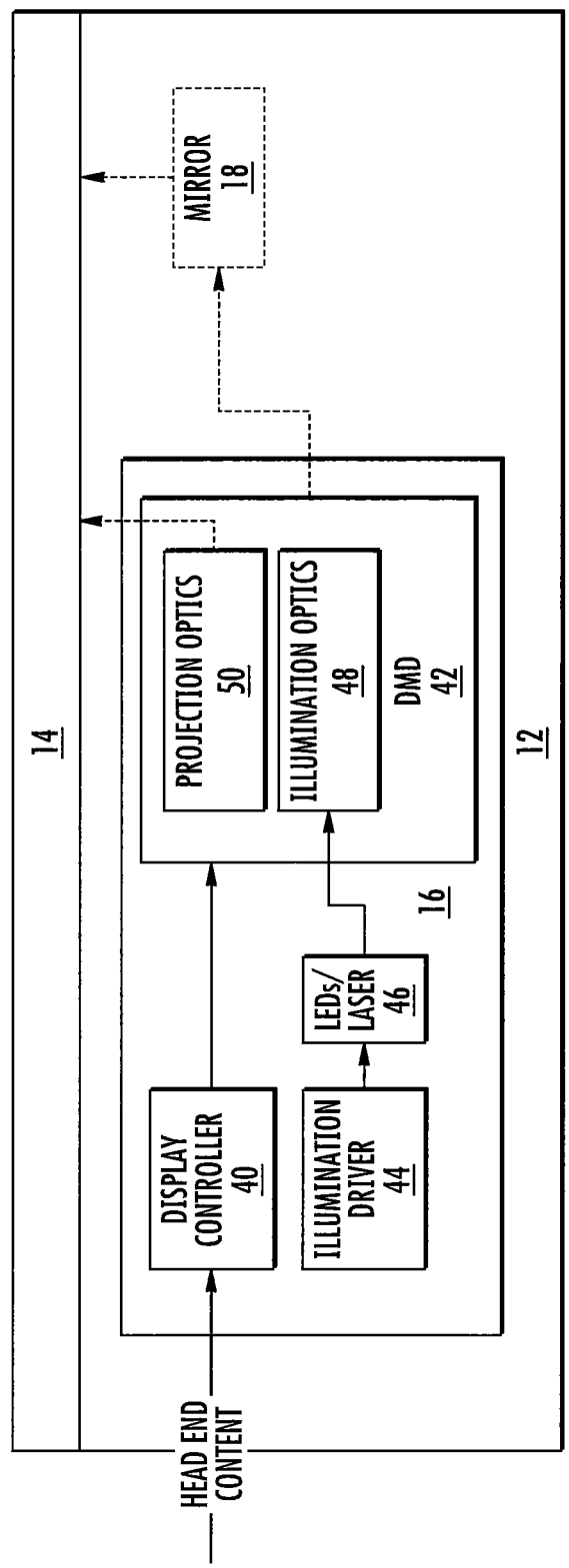
FIG. 7 is a block diagram of electronic and optical components that may be included in the cassette assembly of FIG. 1 according to some embodiments.

FIG. 7 is a block diagram illustrating the projection cassette assembly 10 according to some embodiments. The projector system 16 may include a display controller 40, a digital micromirror device (DMD) 42, an illumination driver 44 and a light source 46 (e.g., LEDs or laser). The DMD 42 may include or communicate with illumination optics 48 that are in communication with the light source 46. The DMD 42 may also include or communicate with projection optics 50. According to some embodiments, the projection optics 50 may include the mirror 18 and are configured to project the image or video to the display surface 14. According to some embodiments, the mirror 18 is a separate component and is configured to reflect the projected image or video to the display surface 14.

The cassette assembly 10 as described herein may provide several advantages. For example, conventional displays for IFE tend to be relatively bulky and heavy and require additional brackets and other hardware for mounting. Conventional IFE displays also tend to require a high amount of power. The cassette assemblies described herein using the projector systems have considerably lower weight and require considerably less power to operate.

The cassette assembly 10 also offers a modular solution. As described above, the cassette assembly can be easily installed and removed from the seatback. This allows the entire cassette assembly 10 or individual components thereof to be adjusted, repaired, replaced or upgraded. For example, the projector 16 and/or the mirror 18 may be adjusted or replaced to provide a larger or smaller video display and/or to change the position of the video display (e.g., by changing the projection path).

Furthermore, conventional IFE displays include glass and require extensive head impact criteria (HIC) certification testing. These displays also frequently require extensive recertification testing when the display or components thereof are modified or replaced. As described above, the viewing surface 14 of the projection cassette assembly 10 can be fabric and/or plastic. This reduces or eliminates the need to HIC certification testing. In particular, only the non-glass viewing surface 14 is in the "impact zone" for HIC testing with the other components such as the projector 16 and the mirror 18 outside of the impact zone.

The fabric and/or plastic viewing surface 14 may also be more durable than the glass IFE displays. For example, the glass displays may be more susceptible to surface scratches.

In addition to being mountable in seatbacks, it is contemplated that projection cassette assemblies as described herein may be mounted in mounting structures located at any suitable location in an aircraft interior. Such locations include, but are not limited to, ceilings, ottomans, sidewalls and lavatories. The curved display surface 14 may facilitate seamless integration with these objects.

Example Entertainment System with Video Display Units

Figure 8:
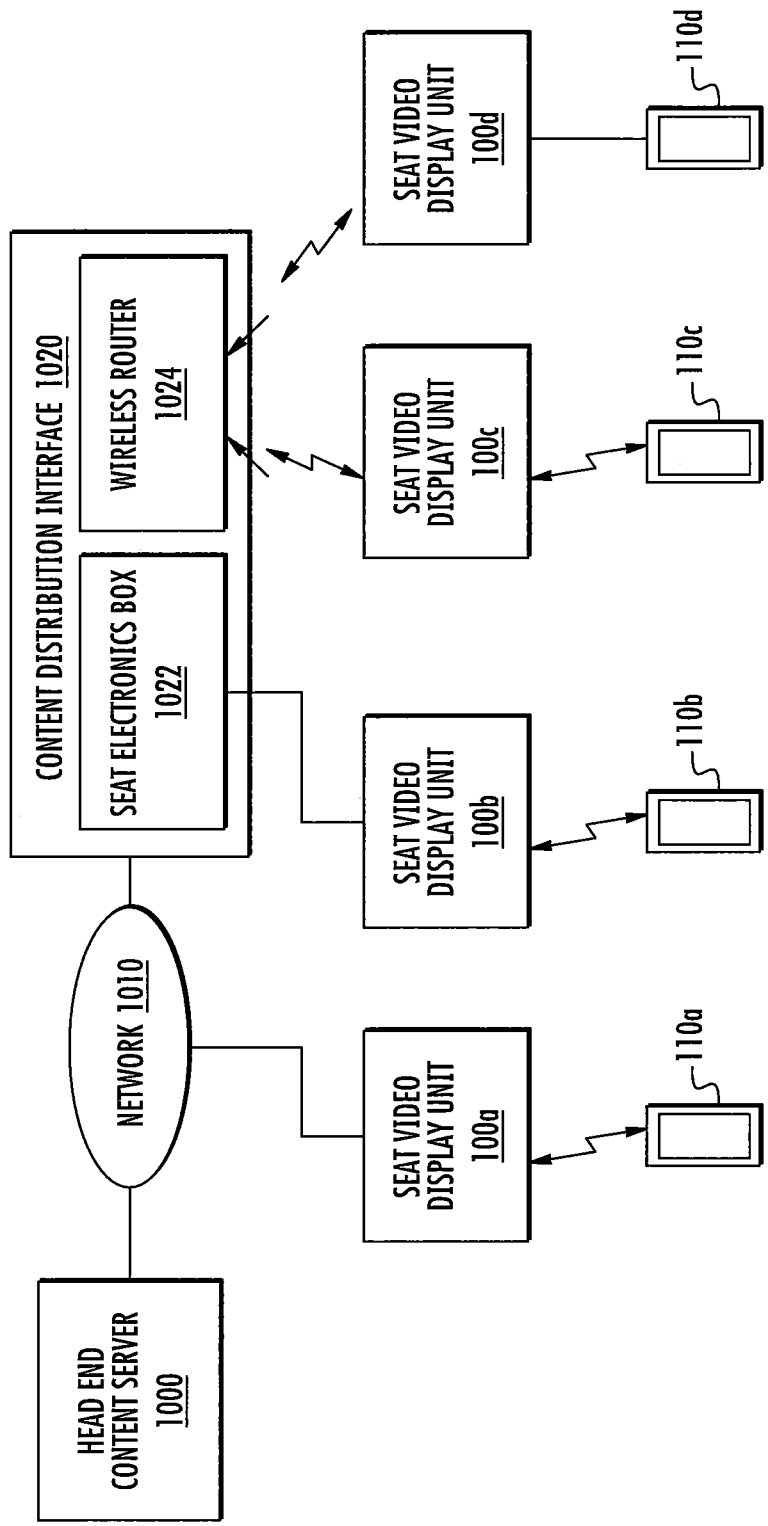
FIG. 8 is a block diagram of an entertainment system that includes video display units and that is configured according to some embodiments.

FIG. 8 is a block diagram of an entertainment system that includes personal electronic devices 110a-d, seat video display units (SVDUs) 100a-d, and other system components which are configured according to some embodiments of the present invention. Referring to FIG. 8, the system includes a head end content server 1000 that contains content that can be downloaded to the SVDUs 100a-d through a data network 1010 and a content distribution interface 1020. The content distribution interface 1020 can include seat electronics boxes 1022, each of which can be spaced apart adjacent to different groups of seats, and/or a wireless router 1024.

Example content that can be downloaded from the head end content server 1000 can include, but is not limited to, movies, TV shows, other video, audio programming, and application programs (e.g., game programs). The wireless router 1024 may be a WLAN router (e.g., IEEE 802.11, WIMAX, etc), a cellular-based network (e.g., a pico cell radio base station), etc.

The SVDUs 100a-d are connected to request and receive content from the head end content server 1000 through a wired and/or wireless network connections through the content distribution interface 1020.

When used in an aircraft environment, the SVDUs 100a-d can be attached to seatbacks so that they face passengers in a following row of seats. For example, a respective one of the SVDUs 100a-d may be or include a projection cassette assembly 10 mounted to a mounting structure in a seatback as described herein. The personal electronic devices 110a-d would each typically be connected to a corresponding one of the SVDUs 100a-d through a wireless RF channel (e.g., WLAN peer-to-peer, Bluetooth, etc.) or may be tethered by a cable (e.g. wire/communication cable) to an associated one of the SVDUs. For example, personal electronic devices 110a-c are connected through wireless RF channels to respective SVDUs 100a-c. The personal electronic device 100d is connected through a wired communication cable (e.g., serial communication cable) to the SVDU 100d.

In accordance with some embodiments, a passenger can operate a personal electronic device 110 to control what content is displayed and/or how the content is displayed on the associated SVDU 100 and/or on the personal electronic device 110. For example, a passenger can operate the personal electronic device 110b to select among movies, games, audio program, and/or television shows that are listed on the SVDU 100b, and can cause a selected movie/game/audio program/television show to be played on the SVDU 100b, played on the personal electronic device 110b, or played on a combination of the SVDU 100b and the personal electronic device 110b (e.g., concurrent display on separate screens).

Each of the personal electronic devices 110a-d in the IFE system may be assigned a unique network address (e.g., media access control (MAC) address, Ethernet address). In addition, the SVDUs 100a-d may be each assigned a unique network address (e.g., MAC address, Ethernet address) which are different from the network addresses of the respective communicatively coupled personal electronic devices 110a-d. In some embodiments, a personal electronic device 110b and a SVDU 100b may be coupled with a same seat-end electronics box 1022 (when utilized by the system) that functions as a local network switch or node to provide network services to SVDUs at a group of passenger seats, for example a row of seats. In other embodiments, the personal electronic device 110b and the respective SVDU 100b may be coupled with different seat-end electronics boxes 1022 (when utilized by the system). For example, a personal electronic device 110 for use by a passenger in an aircraft seat identified by a passenger readable identifier (e.g., a printed placard) as seat "14B" may be attached to a seat electronics box 1022a that provides network connections to row "14", while the SVDU 100b installed in the seat back in front of seat "14B" for use by the passenger in seat "14B" may be attached to a different seat electronics box 1022b that provides network connections to row "13."

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another node, it can be directly connected, coupled, or responsive to the other element or intervening element may be present. In contrast, when an element is referred to as being "directly connected", "directly coupled", "directly responsive", or variants thereof to another element, there are no intervening element present. Like numbers refer to like element throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A projection system for use with an aircraft seat, the projection system comprising:
    a cassette frame comprising a rear panel, an upper panel extending outwardly away from the rear panel, a lower panel extending outwardly away from the rear panel, and first and second side panels, the rear panel, the upper panel, the lower panel and the first and second side panels defining an open ended cavity;
    a front panel configured to couple to a front of the cassette frame to enclose the cavity, the front panel comprising first and second opposite surfaces with the first surface facing the cavity when the front panel is coupled to the front of the cassette frame; and
    a projector system held in the cavity;
    wherein the projector system and the front panel are configured such that an image and/or video projected by the projector system is projected from the cavity through the front panel;
    wherein the projected image and/or video impinges on the first surface of the front panel and is viewable on the second surface of the front panel; and
    wherein the cassette frame is sized and configured to be received and releasably held in an aircraft seatback.

2. The system of claim 1, wherein the cassette frame is sized and configured to be received and releasably held in the aircraft seatback with the second surface of the front panel facing outwardly toward a passenger facing the seatback.

3. The system of claim 2 wherein the front panel comprises fabric and/or plastic.

4. The system of claim 1 wherein the projector system comprises a pico projector.

5. The system of claim 1 wherein the projector system comprises an LED light source, an image generating chip and/or focusing optical devices.

6. The system of claim 1 further comprising a camera and a controller, wherein the camera is configured to record gestures at the front panel and the processor is configured to interpret the recorded gestures and control the image and/or video based on the gestures.

7. The system of claim 1 further comprising a mirror held in the cavity, wherein the projector system is configured to project an image to the mirror such that the image is projected through the front panel.

8. The system of claim 7 wherein the projector system is at a top portion of the cavity and the mirror is at a bottom portion of the cavity.

9. The system of claim 7 wherein the mirror is curved concavely relative to the front panel.

10. The system of claim 1 wherein the front panel is curved.

11. The system of claim 10 wherein the front panel is curved such that at least a portion of the front panel second surface is convex relative to a passenger facing the front panel second surface.

12. The system of claim 1 further comprising a controller, wherein:
    the mirror is curved concavely relative to the front panel;

the front panel is curved such that at least a portion of the front panel first surface is curved; and the controller is configured to distort the image such that a corresponding image projected to the curved mirror and/or the curved first surface appears undistorted.

13. The system of claim 1 comprising a plurality of projector systems configured to project a plurality of tiled images and/or video as the image and/or video.

14. A projection system for use with an aircraft seat, the projection system comprising:

a cassette frame defining an open ended cavity;

a front panel or surface configured to couple to a front of the cassette frame to enclose the cavity; and a projector system held in the cavity;

wherein the projector system and the front panel are configured such that an image and/or video projected by the projector system is projected from the cavity through the front panel;

wherein the front panel comprises first and second opposite sides with the first side facing the cavity when the front panel is coupled to the front of the cassette frame, and wherein the projected image and/or video impinges on the first side of the front panel and is viewable on the second side of the front panel;

wherein the cassette frame is sized and configured to be received and releasably held in an aircraft seatback with the second side of the front panel facing outwardly toward a passenger facing the seatback.

15. The system of claim 14, wherein the mirror is curved concavely relative to the front panel, and wherein the projector system comprises a controller configured to distort the image such that a corresponding image projected to first surface appears undistorted on the first surface from a perspective of a passenger facing the seatback.

16. The system of claim 15, wherein the front panel is curved such that at least a portion of the front panel second surface is convex relative to a passenger facing the front panel second surface.

17. The system of claim 14, the cassette frame further defining a plurality of recesses, each of the plurality of recesses sized and configured to receive a latch member of a mounting structure of the seatback to hold the cassette assembly in the mounting structure when the cassette frame is releasably mounted in the aircraft seatback.

18. A projection system for use with an aircraft seat, the projection system comprising:

a cassette frame defining a cavity;

a front panel coupled to a front of the cassette frame to enclose the cavity, the front panel comprising a first side facing the cavity and a second side, wherein the cassette frame is configured to be releasably mounted in an aircraft seatback with the second side of the front panel facing outwardly from the seatback;

a mirror coupled to the cassette frame within the cavity; and a projector coupled to the cassette frame within the cavity, the projector configured to project an image toward the mirror so that the projected image impinges on the mirror, the mirror configured to reflect the image toward the first side of the front panel to that the projected image impinges on the first side of the front panel and is viewable on the second side of the front panel by a passenger facing the seatback when the cassette frame is releasably mounted in the aircraft seatback.

19. The system of claim 18, wherein the mirror is curved concavely relative to the front panel.

20. The system of claim 18, wherein the projector comprises a controller configured to distort the image such that a corresponding image projected to first surface appears undistorted on the first surface to a passenger facing the seatback when the cassette frame is releasably mounted in the aircraft seatback.

* * * * *